United States Patent [19]

Hideshima

[11] Patent Number: 4,887,125
[45] Date of Patent: Dec. 12, 1989

[54] METHOD OF AND DEVICE FOR DETECTING FOCUSING CONDITION OF IMAGE INCIDENT UPON IMAGE SENSOR

[75] Inventor: Takahiro Hideshima, Kanagawa, Japan

[73] Assignee: Fuji Photo Film Co., Ltd., Kanagawa, Japan

[21] Appl. No.: 156,516

[22] Filed: Feb. 16, 1988

[30] Foreign Application Priority Data

Mar. 5, 1987 [JP] Japan .................................. 62-48678
Mar. 5, 1987 [JP] Japan .................................. 62-48679
Mar. 5, 1987 [JP] Japan .................................. 62-48680

[51] Int. Cl.$^4$ ...................... G03B 27/52; G03B 3/00; G03B 13/18
[52] U.S. Cl. .................................... 355/55; 354/402; 355/45
[58] Field of Search ................................ 354/400–409; 250/201, 568; 353/101; 356/138, 222; 358/227; 355/57, 55, 56, 45

[56] References Cited

U.S. PATENT DOCUMENTS

| | | | |
|---|---|---|---|
| 3,896,304 | 7/1975 | Aoki et al. | 354/402 X |
| 4,411,505 | 10/1983 | Sakai et al. | 354/402 |
| 4,470,676 | 9/1984 | Kinoshita et al. | 354/409 X |
| 4,560,864 | 12/1985 | Kinoshita et al. | 354/409 X |

Primary Examiner—Richard A. Wintercorn
Attorney, Agent, or Firm—Sughrue, Mion, Zinn, MacPeak & Seas

[57] ABSTRACT

A system for detecting focusing conditions of an image incident upon an image sensor. According to a first aspect of this invention, the system is characterized by the signal processing sequence of (a) reading out projected image information incident on the image sensor within the accumulation time period to put out time series output signals for a reading-out period, (b) filtering the time series output signals to obtain high frequency wave component, (c) subjecting the high frequency wave components to half-wave rectification, (d) integrating the half-wave rectified signals after a predetermined delay from the time when the effective signals begin to be put out and (e) utilizing the thus obtained integrated value as a contrast signal. According to a second aspect, the system is characterized by the (c') subjecting the high frequency wave components to rectification and (d') integrating the rectified signals for a pre-set time duration within the reading-out period. A further modified system is characterized by the processing sequence of (a″) projected image information incident on the image sensor within the accumulation time period to put out time series output signals for a reading-out period, (b″) filtering the time series output signals to obtain high frequency wave components, (c″) subjecting the high frequency wave components to rectification and (d″) integrating the rectified signals for a pre-set time duration so that the initial and final portions of the effective output signals corresponding to the effective picture element are cut away.

33 Claims, 6 Drawing Sheets

METHOD OF AND DEVICE FOR DETECTING FOCUSING CONDITION OF IMAGE INCIDENT UPON IMAGE SENSOR

BACKGROUND OF THE INVENTION

1. Field of the Invention

The present invention relates generally to a so-called auto-focusing system, and particularly to a method and device for detecting focusing conditions of an image incident upon an image sensor, such as a CCD line sensor.

2. Prior Art Statement

In the auto-focusing system wherein an image sensor, such as a CCD line sensor, is used, it has been proposed to put out a time series output signal in response to the quantities of light corresponding to respective picture elements and sensed by the image sensor, the time series output signal being utilized as a contrast signal, and to find out the focusing position at which the contrast signal takes the maximum value. For example, U.S. Pat. Nos. 4,560,864 and 4,470,676 disclose systems wherein the absolute values of high frequency wave components of the time series output signal are integrated to be utilized as the contrast signals.

However, the effective output signals corresponding to effective picture elements contributing for the detection of real image informations are not fed throughout the whole range from the starting time to the terminating time of the reading-out period, but are fed only in a certain time duration within the reading-out period. For instance, referring to FIG. 3, an output signal B fed for a given reading-out period $T_0$ between the transfer pulses A and A includes an effective output signal $B_1$ which is fed within a limited time duration $T_1$ and ineffective output signals $B_2$ and $B_3$ which are fed for time durations out of said limited time duration $T_1$. The electric potentials of the ineffective output signals $B_2$ and $B_3$ are substantially zero, whereas the effective output signal $B_1$ has a positive electric potential. Thus, the output signal B is shifted stepwisely at the point between the output signals $B_2$ and $B_1$ and also at the point between the output signals $B_1$ and $B_3$. As a result, the high frequency wave components C of the output signal B include high false signals $C_1$ and $C_2$ the generated due to the stepwise shift of the output signal B. The result of integration of the absolute values of the high frequency wave components C, according to the prior art technology, involves errors due to the integration of the false signals $C_1$ and $C_2$.

On the other hand, the practical output signal contains various noise signals. Such noise signals include, for example, fixed pattern noises which cause unevenness in brightness of a specific picture element, internal noise signals generated internally of the image sensor, and preamplifier noise signals. The internal noise signals and the preamplifier noise signals are random noise signals, and thus such noise signals incidentally and continually be always contained in the output signal. In contrast thereto, the fixed pattern noise signals are contained in the output signal for a specific picture element generated from a given image sensor.

Since the contrast signal obtained by the prior art technology contains various noise signals as described above, the contrast signal is affected seriously by the random noise signals when the reading-out period is set for a long time, and also affected by the fixed pattern noise signals if the time or range for integration is varied. For this reason, accurate focus control cannot be achieved by the prior art technology.

OBJECTS AND SUMMARY OF THE INVENTION

In view of the aforementioned disadvantages of the prior art system, a first object of this invention is to provide an auto-focusing system which is remarkedly improved in accuracy by integrating the absolute values of high frequency components of the output signal from a line sensor to detect focusing conditions of an image on an image sensor in a manner such that the influences by the false signals contained in the output signal from the line sensor and generated due to the stepwise shifts of electric potential at the points between the effective signal and the ineffective signals, are excluded.

A second object of this invention is to provide an auto-focusing system which is remarkedly improved in accuracy by integrating the absolute values of high frequency components of the output signal from a line sensor to detect focusing conditions of an image incident upon the sensor in a manner such that the influences by the noise signals contained in the output signal from the line sensor are reduced.

A third object of this invention is to provide an auto-focusing system which is remarkedly improved in accuracy by integrating the absolute values of high frequency components of the output signal from a line sensor to detect focusing conditions of an image incident upon the sensor in a manner such that the influences by the noise signals and false signals contained in the output signal from the line sensor are excluded.

The first object of this invention is achieved by the provision of a system for detecting focusing conditions of an image incident upon an image sensor, which comprises:

(a) means for reading out projected image informations incident upon said image sensor within an accumulation time period to put out time series output signals for a reading-out period;

(b) means for filtering said time series output signals to obtain high frequency wave components;

(c) means for subjecting said high frequency wave components to half-wave rectification to obtain half-wave rectified signals;

(d) means for integrating said half-wave rectified pulse signals after a certain delay from the time when effective output signals corresponding to the effective picture elements begin to put out; and (e) means for utilizing the integrated value of said half-wave rectified signals as a contrast signal to detect the focusing conditions.

The high frequency wave components C of the time series output signals B from the image sensor contain false signals $C_1$ and $C_2$. However, since the high frequency wave components C are subjected to half-wave rectification, the false signal $C_2$ is not contained in the rectified signals. On the other hand, the false signal $C_1$ is excluded, since integration is performed after a certain delay so that the false signal $C_1$ is precluded. As the result, the integrated value does not contain the false signals $C_1$ and $C_2$. The thus obtained integrated value is utilized as a signal indicating the contrast of the image, and the image may be focused precisely on the image sensor by moving the projection lens at the position where the contrast signal takes the maximum intensity.

The second object of this invention is achieved by the provision of a system for detecting focusing conditions of an image incident upon an image sensor, which comprises:

(a) means for reading out projected image informations incident upon said image sensor within an accumulation time period to put out time series output signals for a constant reading-out period;

(b) means for filtering said time series output signals to obtain high frequency wave components;

(c) means for subjecting said high frequency wave components to rectification to obtain rectified signals;

(d) means for integrating said rectified signals for a pre-set time duration within said reading-out period; and (e) means for utilizing the integrated value of said rectified signals as a contrast signal to detect the focusing conditions.

Since the high frequency wave components of the time series output signals from the image sensor contain noise signals, the integration of the rectified output signal of the high frequency components is affected by the presence of such noise signals. However, since the time or range for integration is fixed, the influence by the noise signals is always constant. The thus obtained integrated value is utilized as a signal indicating the contrast of the image, and the image may be focused precisely on the image sensor by moving the projection lens at the position where the contrast signal takes the maximum intensity.

The third object of this invention is achieved by the provision of a system for detecting focusing conditions of an image incident upon an image sensor, which comprises:

(a) means for reading out projected image informations incident upon said image sensor within an accumulation time period to put out time series output signals for a reading-out period;

(b) means for filtering said time series output signals to obtain high frequency wave components;

(c) means for subjecting said high frequency wave components to rectification to obtain rectified signals;

(d) means for integrating said rectified signals for a pre-set time duration so that the initial and final portions of the effective output signals corresponding to the effective picture elements are cut away; and (e) means for utilizing the integrated value of said rectified signals as a contrast signal to detect the focusing conditions.

The high frequency wave components C of the time series output signals B from the image sensor contain noise signals and false signals $C_1$ and $C_2$. Accordingly, if the rectified output signals of the high frequency wave components are integrated, the obtained value is affected by the presence of the noise signals and the false signals $C_1$ and $C_2$. However, by limiting the range for integration within the range where only the effective output signals are supplied, influences by the noise signals are reduced substantially and the influences by the false signals $C_1$ and $C_2$ are perfectly excluded. The thus obtained integrated value is utilized as a signal indicating the contrast of the image, and the image may be focused precisely on the image sensor by moving the projection lens at a position where the contrast signal takes the maximum intensity.

BRIEF DESCRIPTION OF THE DRAWINGS

The above and other objects of this invention will be apparent from the following detailed description of the presently preferred embodiments, by way of example only, with reference to the appended drawings, in which.

DESCRIPTION OF PREFERRED EMBODIMENTS

Referring to FIGS. 1 to 4 showing a first embodiment of this invention, the construction and operation thereof will now be described.

Figure 1:
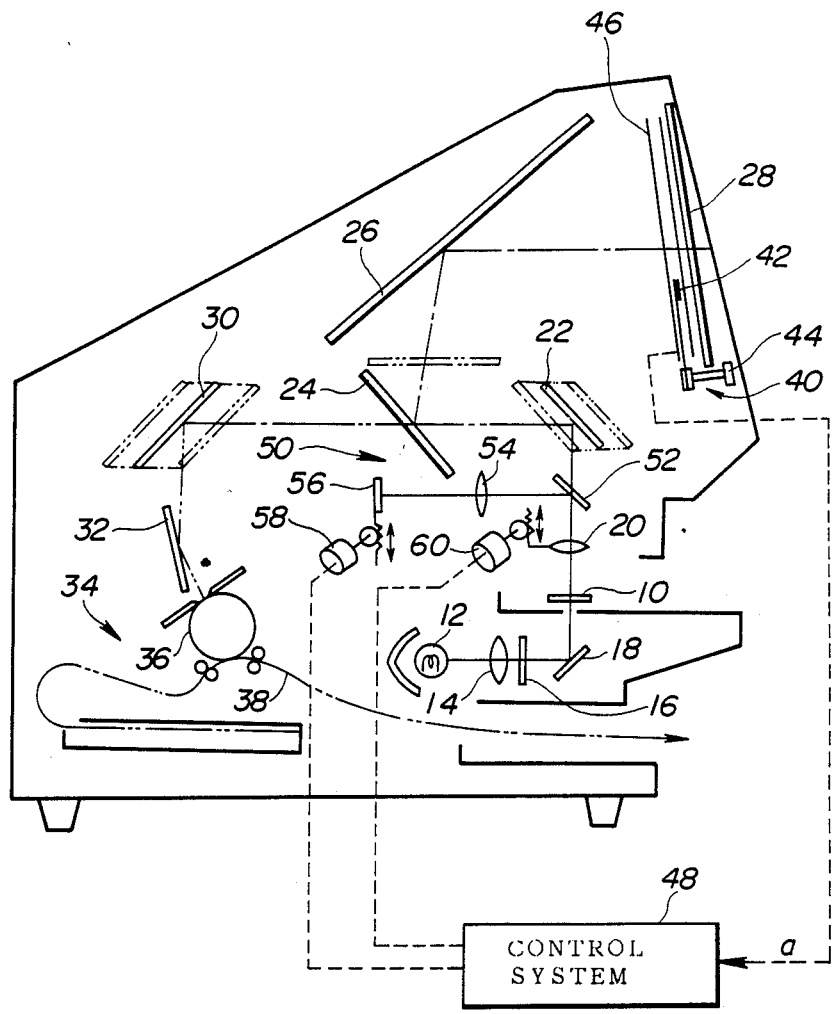
FIG. 1 is a schematic illustration showing a reader printer in which an embodiment of this invention is incorporated.
Figure 2:
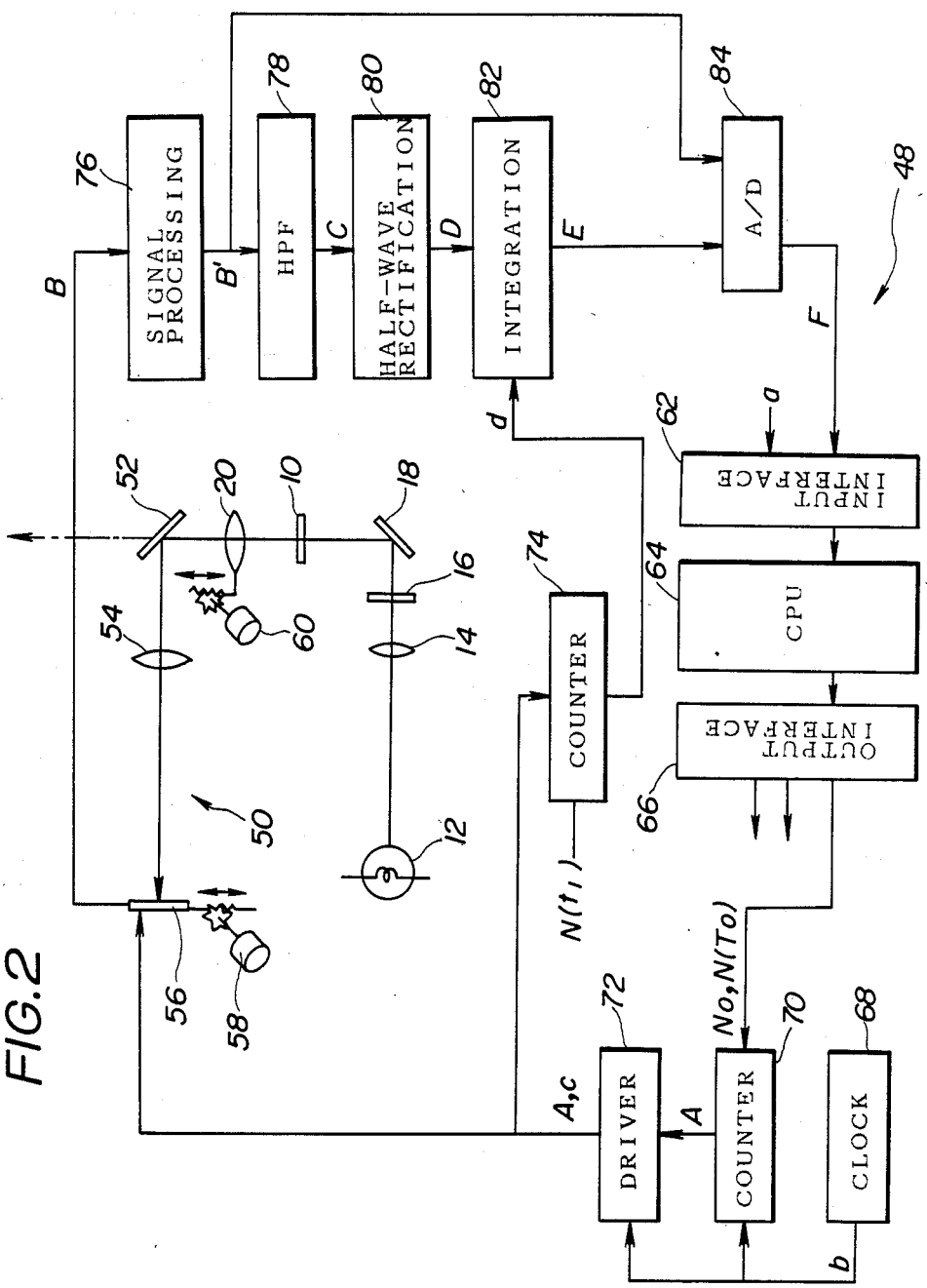
FIG. 2 is a block diagram showing one control system embodying the auto-focusing system of this invention.

Initially referring to FIGS. 1 and 2, an original picture image is born on an image carrier 10, such as a microfish or a frame of a micro roll film. A light from a light source 12 passes through a condenser lens 14, a heat shield filter 16 and a reflector 18 onto the lower face of the image carrier 10. In the reader mode use, the light transmitting through the image carrier 10, i.e. the image projecting light, passes through a projection lens 20 and reflectors 22, 24, 26 to a light-transmitting screen 28 on which an enlarged image of the original picture is focused. In the printer mode use, the reflector 24 is moved to a position shown by the dots-and-dash line in FIG. 1 so that the image projecting light is reflected by the reflectors 22, 30 and 32 to be projected on a surface of photosensitive recording means. In the illustrated example, the recording means is a slit exposure type printer 34 of PPC system. The printer 34 has a photosensitive drum 36 which is rotated in synchronism with the movements of the reflectors 22 and 30 so that a latent image is formed on the surface of the photosensitive drum 36. The thus formed latent image is developed by the use of a toner having a predetermined polarity, and the developed toner image is transferred onto a paper sheet 38.

Reference numeral 40 designates a zone setting means which includes a mark 42 showing a desired focus zone and a manual operation knob 44 for moving the mark 42 at a desired position on the screen 28. The set position a is detected by a position detecting member 46, and the signal showing the position a is fed to a control system 48.

A focus controlling optical system is generally denoted by 50, and comprises a half-mirror 52 disposed on the optical axis of the image projection light, a projection lens 54, a CCD line sensor 56 used as image sensing means, and a servo motor 58. A portion of the image projecting light transmitting through the projection lens 20 is reflected by the half-mirror 52, and passes through the projection lens 54 to the line sensor 56. The line sensor 56 can be moved in the plane perpendicular to the optical axis of the image projecting light by means of the servo motor 58. The projection lens 54 has a focal distance s that a precisely focused image is incident upon the photosensitive surface of the line sensor 56 when the projection lens 20 is moved to the position at which a focused image projecting light is incident upon the screen 28 or upon the surface of the photosensitive drum 36.

The auto-focusing system in the illustrated embodiment has an additional servo motor 60 for moving the projection lens 20 in the direction parallel to the optical axis of the image projecting light, and the servo motor 60 is actuated by the control system 48 so that the image projecting light is precisely focused on the screen 28 or on the surface of the photosensitive drum 36.

FIG. 2 is a schematic illustration of the control system 48 which comprises an input interface 62, a CPU 64 utilized as a processing means, an output interface 66 and a clock 68. When a two-phase CCD is used as the line sensor 56, two-phase clock pulses b of, for example, 1 MHz are supplied from the clock 68.

Reference numeral 70 designates a subtraction counter. A pulse number $N(T_0)$ is set by the CPU 64 so that the pulse number $N(T_0)$ of the clock pulses b corresponds to the period $T_0$ set by transfer pulses A (see FIG. 3). The clock pulses b are subtracted from the set pulse number $N(T_0)$ by the subtraction counter 70. When the number in the counter 70 reaches zero, a transfer pulse A is put out. Reference numeral 72 is a driver which feeds the transfer pulse A and the read-out pulse c. The transfer pulse A transfers the electric charge accumulated in the light receiving portion of the line sensor 56 within a certain accumulation time. The read-out pulses c set a time duration substantially shorter than the period $T_0$ into the line sensor 56. The electric charge accumulated in the light receiving portion within the effective accumulation period set by one cycle interval between the transfer pulses A and A is transferred to the transferring portion of the line sensor 56 collectively at one time during the read-out period $T_0$, that is, the next cycle interval between the transfer pulses A and A. Then, the once transferred electric charge is put out as a time series output signal B upon receipt of the read-out pulse c.

Reference numeral 74 designates a subtraction counter. The timing $t_1$ for instructing an integration circuit 82, which will be described in detail hereinafter, to commence its integration operation is set by this counter 74. In detail, the count number $N(t_1)$ of the clock pulses b for setting the timing $t_1$ is stored, and the clock pulses b are subtracted from the stored number $N(t_1)$ in synchronism with the transfer pulse A. When the number in the counter 74 reaches zero, a signal d instructing the integration circuit 82 to commence its integration operation is put out.

Figure 3:
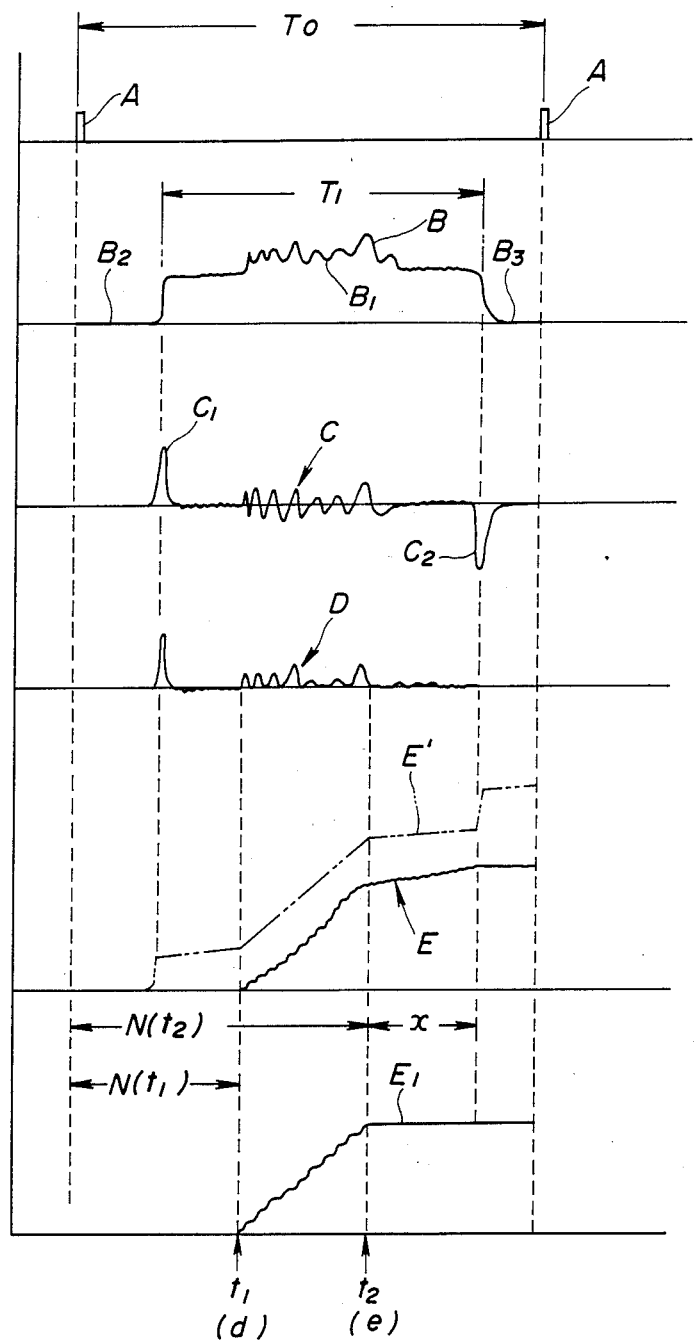
FIG. 3, is a chart showing the wave forms at respective processing steps in the auto-focusing system of FIG. 2.
Figure 4:
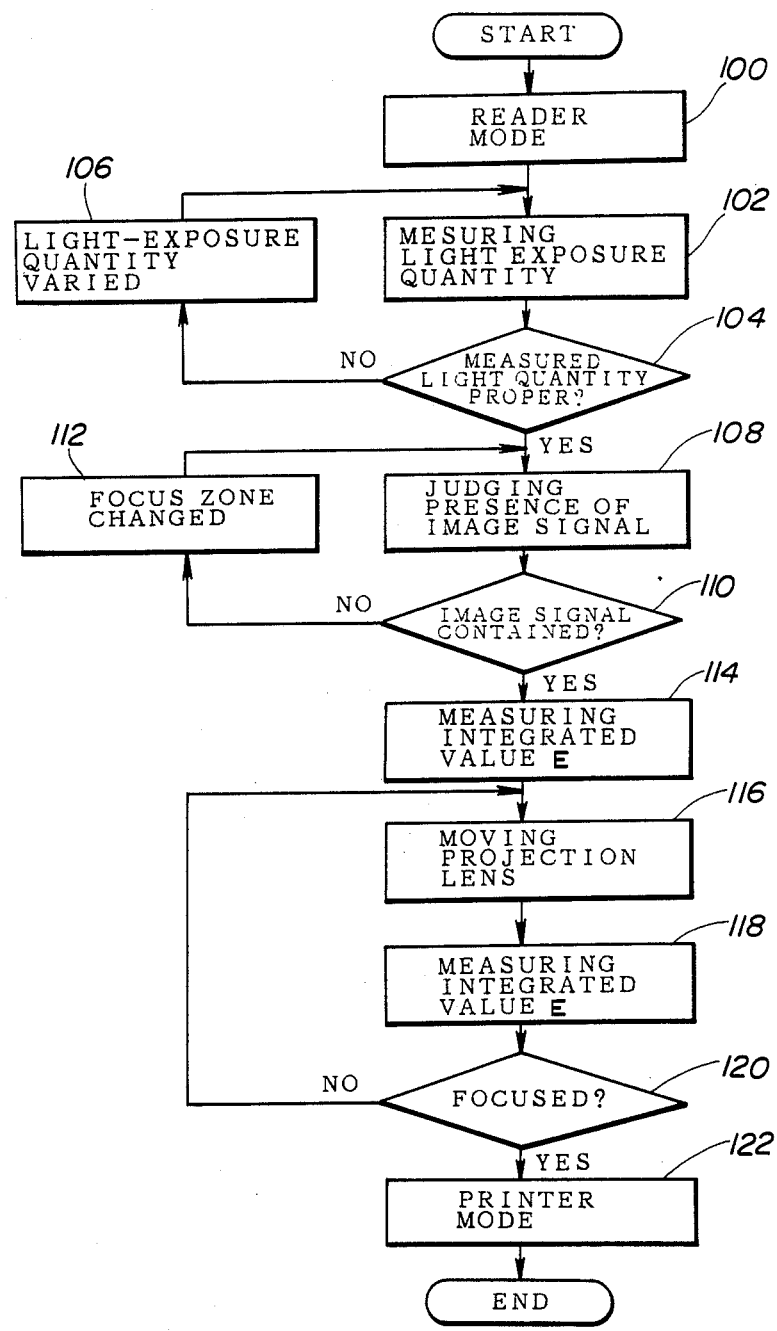
FIG. 4 is a flow chart showing the processing sequence.

The output signal B from the line sensor 56 is subjected to correction for correcting the influences by the dispersion in characteristics of respective picture elements and then subjected to wave-shaping by the signal processing circuit 76, and fed to a high pass filter (HPF) 78 acting as filter means. As seen from FIG. 3, the output signal B contains ineffective output signals $B_2$ and $B_3$ which do not involve outputs from the picture element, and an effective signal $B_1$ which involves an effective output from the picture element. The levels of the signals are shifted stepwisely at the point between the output signals $B_2$ and $B_1$ and also at the point between the output signals $B_1$ and $B_3$. The output signal B is filtered by the HPF 78, and only the high frequency components C thereof are fed to a half-wave rectifier means or circuit 80. The high frequency wave components C contains false signals $C_1$ and $C_2$, as shown in FIG. 3. The false signal $C_2$ is removed from the signal D which is obtained by half-wave rectification.

Reference numeral 82 designates an integration means or circuit for integrating the signal D obtained by half-wave rectification. The integration operation by the integration circuit 82 is started after an instruction signal d instructing commencement of integration is supplied from the counter 74 at the timing $t_1$. Since the false signal $C_2$ has been removed by the preceding half-wave rectification, the integrated value E is not affected by both of the false signals $C_1$ and $C_2$. For comparison purpose, the change in integrated value E' which is obtained by integrating the rectified signal D for the full range of reading-out period $T_0$ is shown by the dots-and-dash line in FIG. 3.

The thus obtained integrated value E is fed, upon receipt of the transfer pulse A indicating termination of the reading-out period $T_0$, through an A/D converter 84 and an input interface 62 to the CPU 64.

The operation of this embodiment will now be described. As an initial step, the control system 48 reads the position a set by the zone setting means 40, and then controls the servo motor 58 so that the image projecting light corresponding to the set zone is projected on the line sensor 56. Assuming now that the user selects the reader mode wherein the reflector 24 occupies the position as shown by the real line in FIG. 1, an image of the desired original picture is projected on the screen 28 (Step 100). A portion of the image projecting light is reflected by the half-mirror 52 to be fed to the line sensor 56.

The next step instructed by the control system 48 is the step 102 of measuring the light exposure quantity based on the output from the line sensor 56. More specifically, the output signal B' from the signal processing circuit 76 is fed through the interface 62 and read in the CPU 64 which controls the light exposure quantity. If the light exposure quantity takes an improper value (Step 104), the light exposure quantity is varied (Step 106) and then the measurement of light exposure quantity is carried out again. The light exposure quantity may be controlled either by adjusting the light quantity emanated from the light source 12 so that the electric potential of the signal corresponding to the picture element forming the background region takes a pre-set value, or by adjusting the time interval between transfer pulses A.

At the next step 108, the control system 48 decides or judges whether the projecting light put into the line sensor 56 contains an image signal or not. Such a decision is rendered, for example, by counting the turning or reversion times from white to black and vice versa included in the projecting light signal to judge that the light signal contain an image signal when the counted times are more than a predetermined value (Step 110). When the decision indicates that no image signal is contained, the control signal 48 generates a warning signal through a buzzer or lamp to instruct that another zone shall be addressed (step 112). When a warning signal is generated, the user manipulates the knob 44, while observing the screen 28, to move the mark 42 at a position where an image is projected on the screen 28.

Then, the control system 48 controls the auto-focusing conditions depending on the output from the line sensor 56. The integrated value E is obtained as an analog value from the output signal B' as the result of processing through the high pass filter 78, the rectification circuit 80 and the integration circuit 82 (Step 114), as described hereinbefore, and the analog value is converted into a digital signal which is read in the CPU 64 as the contrast signal F. The position of the projection lens 20 for obtaining the maximum integrated value E is determined by the CPU 64. In detail, the first integrated value E is stored, and then the projection lens 20 is moved by a very small distance (Step 116) followed by calculation of the second integrated value E (Step 118). The first integrated value is compared to the second integrated value to inspect whether the integrated value E takes the maximum value or not, whereby it is decided whether the given position of the lens 20 is coincident with the focusing position or not (Step 120).

By selecting the printer mode while maintaining the system under such focused condition, the reflector 24 swings to the position shown by the dots-and-dash line in FIG. 1 so that the image can be transferred onto the paper sheet 38 to form a hard copy.

In the embodiment described above, the timing $t_1$ for commencing integration by the integration circuit 82 is delayed so that the false signal $C_1$ is not contained in the integrated value, and the integration operation is continued until the next transfer signal A is generated. However, the practical output signal B, even if it is corresponding to the background region in which no image signal is included, contains very small fluctuations due to offset of the amplifier or other causes. Due to such very small fluctuations, the signal D after the half-wave rectification also contains very small fluctuations. As a result, the integrated value E is increased slowly even during the time duration x (see FIG. 3) corresponding to the background region. However, the variation in increment of the integrated value E added by integration during the time duration x is little, when the reading-out period $T_0$ is fixed for respective scanning cycles. Accordingly, the aforementioned first embodiment of this invention is conveniently applied for use while fixing the reading-out period $T_0$ to a pre-set time duration.

Figure 5:
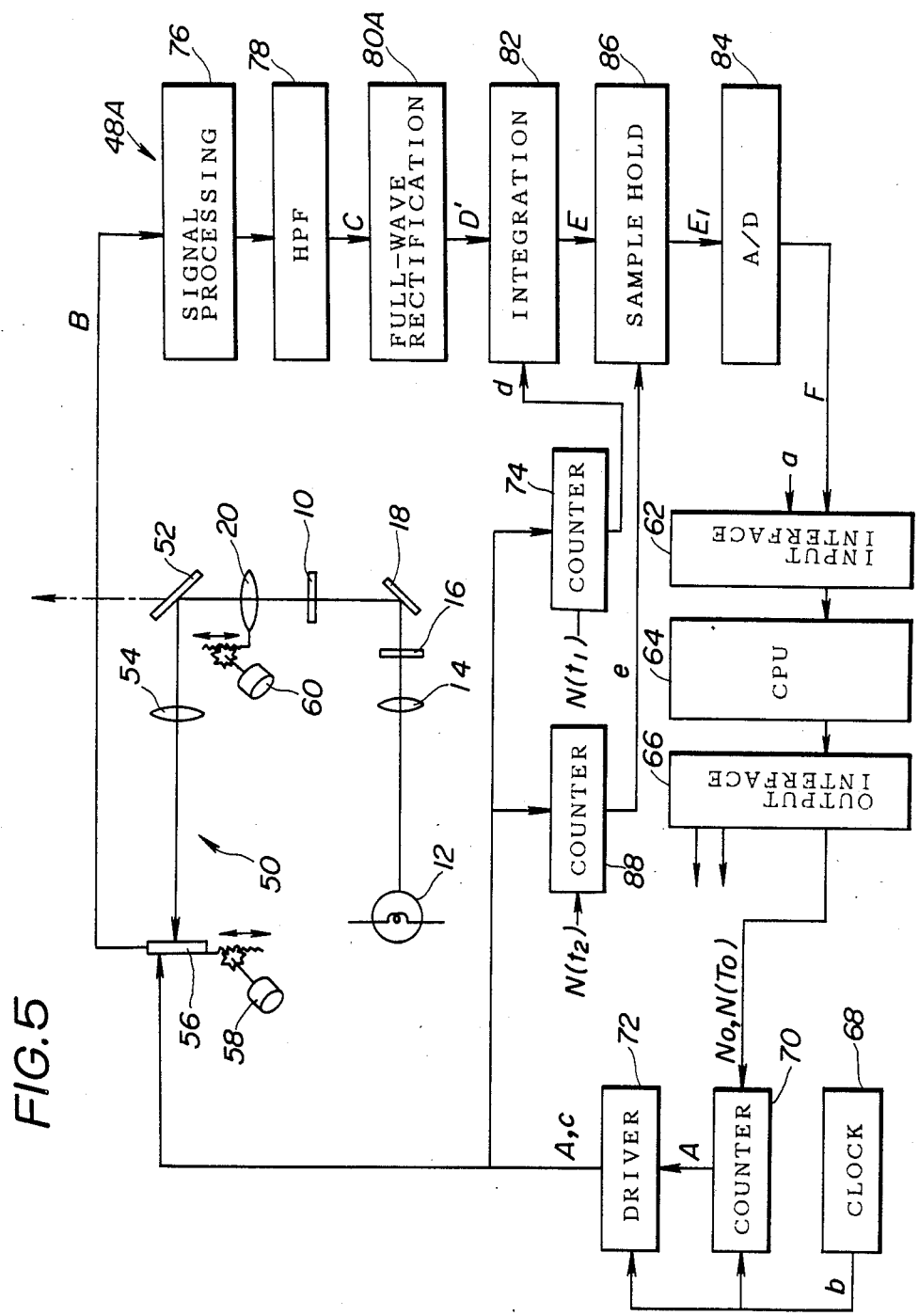
FIG. 5 is a block diagram showing another embodiment of the control system embodying the auto-focusing device of this invention.
Figure 6:
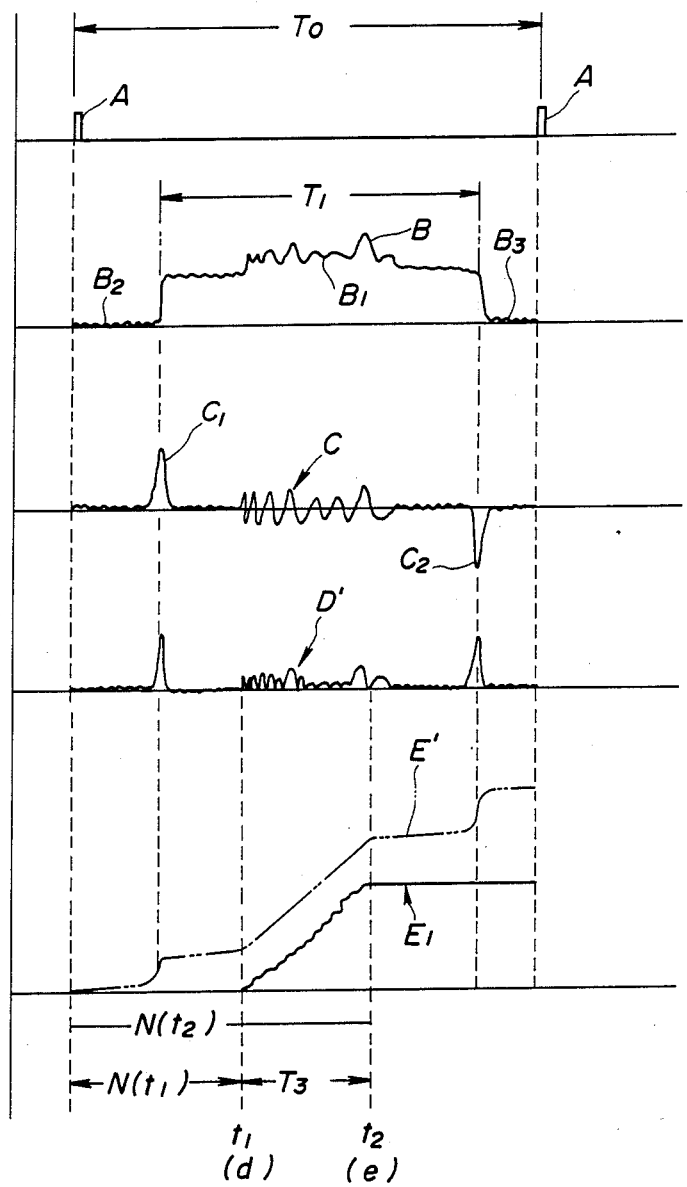
FIG. 6 is a chart showing the wave forms at respective processing steps in the auto-focusing system of FIG. 5.

A second embodiment of this invention will now be described in detail, while referring to FIGS. 5 and 6 showing, respectively, a block diagram of a control system 48A and a chart showing the wave forms at sequential steps in the second embodiment.

In the second embodiment, a full-wave rectifier circuit 80A is used in place of the half-wave rectifier circuit 80 in the first embodiment (see FIG. 2), and a sample hold circuit 86 and a subtraction counter 88 are additionally incorporated.

In the second embodiment, the pulse number $N_0$ of clock pulses b corresponding to the accumulation time may be varied and controlled by the CPU 64 so that the exposure light quantity may be adjusted to have an appropriate value. On the other hand, the pulse number $N(T_0)$ corresponding to the reading-out period $T_0$ is set to a constant value independently of the accumulation time. The pulse numbers $N_0$ and $N(T_0)$ are set by the CPU 64 and read in the subtraction counter 70.

Into an additional subtraction counter 88 set is a count number $N(t_2)$ of clock pulses b indicating the termination timing $t_2$ of the time duration corresponding to the region in which image signal is contained in the effective output signal B at high probability, and a signal e is supplied from the counter 88 at the timing $t_2$.

Likewise in the first embodiment, the subtraction counter 74 feeds the signal d instructing the integration circuit 82 to commence its integration operation at the timing $t_1$.

In response to the signal e fed from the counter 88, a sample hold circuit 86 stores the integrated value $E_1$ at the timing $t_2$ and the integrated value $E_1$ is fed to the CPU 64. Consequently, the signal D' obtained by full-wave rectification is integrated for a time duration starting from the receipt of signal d and terminating upon receipt of signal e. The integrated value is, therefore, neither influenced by the false signals $C_1$ and $C_2$ nor influenced by the output signals from the background region and the noise signals contained in the ineffective output signals $B_2$ and $B_3$.

Upon receipt of transfer pulse A indicating termination of the reading-out period $T_0$, the integrated value $E_1$ is passed through the A/D converter 84 and the input interface 62 to be read in the CPU 64.

As will be seen from the foregoing, the time duration for integration is fixed to a constant period $T_3$ between the the time at which the false signal $C_1$ is generated and the time at which the false signal $C_2$ is generated. Since the time and range for reading-out operation are set to the constant time and range, the total influences by the signals other than the net contrast signal showing the real image information take a constant value, such influences including the influences by the false signals $C_1$ and $C_2$ appearing at constant timings, the influences by the fixed pattern noise signals appearing at constant positions and the influences by the random noise signals appearing evenly throughout the whole range. Accordingly, precise detection of focusing conditions can be made by moving the projection lens 20 to the position at which the maximum contrast signal is obtained.

In the illustrated process, the timing $t_1$ for instructing the integration circuit 82 to initiate its integration operation may be delayed from the time at which the false signal $C_1$ is generated, and the timing $t_2$ for instructing termination of integration is set prior to the time at which the false signal $C_2$ is generated, according to a further aspect of this invention (Third Embodiment). Accordingly, influences by the false signals $C_1$ and $C_2$ are excluded at all. The influences by the noise signals contained in the cut-away portions of output signal B, i.e. the portion prior to the timing $t_1$ and the portion after the timing $t_2$, are also excluded, and thus major portions of influences by noise signals are cut away. Assuming now that the reading-out period $T_0$ is varied and the accumulation time is controlled by varying the period $T_0$, the major portion of the influences by noise signals can be cut away by the method of this embodiment to obtain a precise contrast signal F. The dots-and-dash line E' in FIG. 6 shows the change in the integrated value E when the time duration for integration is set to cover the full range of the reading-out period $T_0$.

Although the high frequency components C are subjected to full-wave rectification in the illustrated example of the second and third embodiments, the second and third embodiments can be applied for practice while subjecting the high frequency components C to half-wave rectification similarly as in the first embodiment. As will be estimated by referring to FIG. 3 showing the case of the first embodiment where the high frequency wave components C are subjected to half-wave rectification, the increment of the integrated value E added by the integration of the wave portion x corresponding to the background region is removed. Even when the time duration x is varied, i.e. when the reading-out period $T_0$ is changed, a more precise detection of focusing condition may be realized by excluding the change in integrated value E due to integration of the wave portion appearing during the time duration x to utilize the integrated value $E_1$ at the timing $t_2$ as the contrast signal.

When the reading-out period $T_0$ is set to a constant time duration within which integration is performed, the false signal $C_2$ is excluded from the integrated range by subjecting the signal C to half-wave rectification similar to the case of the first embodiment so that the subtraction counter 88 for supplying the signal e at the timing $t_2$ may be omitted. In such a case, there is no need of incorporation of the sample hold circuit 86, as well.

Without departing from the principle of this invention, many modifications may be made by a person having ordinary skill in the art. For example, the image sensing means used in this invention is not necessarily limited to the CCD sensor and may be replaced by a MOS type line sensor or an area sensor.

According to the advantageous aspect of the first embodiment of this invention, the high frequency components of the output from the image sensor are subjected to half-wave rectification and then the signal obtained by half-wave rectification is integrated so that the influences by the stepwise shifts of the output signal at the points between the ineffective output signals and the effective output signal are precluded. As a result, the accuracy in controlling the focusing conditions is improved.

According to the advantageous aspect of the second embodiment of this invention, the high frequency components of the output from the image sensor are subjected to full-wave or half-wave rectification and then the signal obtained by rectification is integrated while setting the reading-out period to a constant time duration. As a consequence, the influences by the false signals and the influences by noise signals added to the contrast signal take always constant values, leading to improvement in accuracy of the focusing condition detecting operation.

According to the advantageous aspect of the third embodiment of this invention, the high frequency components of the output from the image sensor are subjected to full-wave or half-wave rectification and then the signal obtained by rectification is integrated for a pre-set time duration to preclude integration of false signals appearing due to shifts between the ineffective output signals and the effective output signal from the line sensor. Consequently, the influences by the false signals are perfectly excluded, leaving only little influences by noise signals, whereby the accuracy in detecting focusing conditions can be improved.

What is claimed is:

1. A method of detecting focusing conditions of an image incident upon an image sensor, comprising:
    (a) the step of reading out projected image informations incident upon said image sensor within an accumulation time period to put out time series output signals for a reading-out period;
    (b) the step of filtering said time series output signals to obtain high frequency wave components;
    (c) the step of subjecting said high frequency wave components to half-wave rectification to obtain half-wave rectified signals;
    (d) the integration step of integrating said half-wave rectified signals after a certain delay from the time when effective output signals corresponding to the effective picture elements begin to be put out; and
    (e) the step of utilizing the integrated value of said half-wave rectified signals as a contrast signal to detect the focusing conditions.

2. The method according to claim 1, wherein said integration step (d) is continued until the last moment of said reading-out period.

3. The method according to claim 1, wherein said integration step (d) is continued until the last output signal corresponding to the last effective picture element on said image sensor has been put out.

4. The method according to claim 2, wherein said reading-out period is fixed.

5. The method according to claim 3, wherein said reading-out period is fixed.

6. The method according to claim 2, wherein said reading-out period is variable.

7. The method according to claim 1, wherein said image sensor is any of a CCD line sensor, a MOS type line sensor or an area sensor.

8. A method of detecting focusing conditions of an image incident upon an image sensor, comprising:
    (a) the step of reading out projected image informations incident upon an image sensor within a constant accumulation time period to put out time series output signals for a constant reading-out period;
    (b) the step of filtering said time series output signals to obtain high frequency wave components;
    (c) the step of subjecting said high frequency wave components to rectification to obtain rectified signals;
    (d) the integration step of integrating said rectified signals for a pre-set time duration within said reading-out period; and
    (e) the step of utilizing the integrated value of said rectified signals as a contrast signal to detect the focusing conditions.

9. The method according to claim 8, wherein said high frequency wave components are subjected to full-wave rectification at said step (c).

10. The method according to claim 8, wherein said high frequency wave components are subjected to half-wave rectification at said step (c).

11. The method according to claim 8, wherein said integration step (d) is continued for a pre-set time duration so that the initial and final portions of the effective output signals corresponding to the effective picture elements are cut away.

12. The method of detecting focusing conditions of an image on an object according to claim 8, wherein said image sensor is any of a CCD line sensor, a MOS type line sensor or an area sensor.

13. A method of detecting focusing conditions of an image incident upon an image sensor, comprising:
    (a) the step of reading out projected image informations incident upon an image sensor within a certain accumulation time period to put out time series output signals for a reading-out period;
    (b) the step of filtering said time series output signals to obtain high frequency wave components;
    (c) the step of subjecting said high frequency wave components to rectification to obtain rectified signals;

(d) the integration step of integrating said rectified signals for a pre-set time duration so that the initial and final portions of the effective output signals corresponding to the effective picture elements are cut away; and (e) the step of utilizing the integrated value of said rectified signals as a contrast signal to detect the focusing conditions.

14. The method according to claim 13, wherein said reading-out period is fixed.

15. The method according to claim 13, wherein said reading-out period is variable.

16. The method according to claim 13, wherein said high frequency wave components are subjected to full-wave rectification at said step (c).

17. The method according to claim 13, wherein said high frequency wave components are subjected to half-wave rectification at said step (c).

18. The method according to claim 13, wherein said image sensor is any of a CCD line sensor, a MOS type line sensor or an area sensor.

19. In a device for controlling a projection lens of an optical system to position said projection lens at the focusing position, a device for detecting focusing conditions of an image comprising:
(a) image sensing means for reading out projected image information on said image sensor within a certain accumulation time period to put out time series output signals for a reading-out period;
(b) filter means for filtering the output from said image sensing means to obtain high frequency wave components;
(c) half-wave rectifier means for subjecting said high frequency wave components from said filter means to half-wave rectification to obtain half-wave rectified signals;
(d) integrator means for integrating said half-wave rectified signals after a certain delay from the commencement of put-out of the effective signals corresponding to effective picture elements on said image sensor; and
(e) processing means for comparing the change in integrated value put out from said integrator means with the change of the position of the projection lens to monitor the focusing conditions, said integrated value being utilized as a contrast signal.

20. The device according to claim 19, wherein said integrator means (d) integrates said output from said half-wave rectifier means until the last moment of said reading-out period.

21. The device according to claim 19, wherein said integrator means (d) integrates said output from said half-wave rectifier means until the last output signal for forming the last effective picture element on said image sensing means has been put out.

22. The device according to claim 20, wherein said reading-out period is fixed.

23. The device according to claim 21, wherein said reading-out period is fixed.

24. The device according to claim 21, wherein said reading-out period is variable.

25. The device according to claim 19, wherein said image sensing means (a) is any of a CCD line sensor, a MOS type line sensor or an area sensor.

26. In a device for controlling a projection lens of an optical system to position said projection lens at the focusing position, a device for detecting focusing conditions of an image comprising:
(a) image sensing means for reading out projected image informations incident upon an image sensor within a certain accumulation time period to put out time series output signals for a constant reading-out period;
(b) filter means for filtering the output from said image sensing means to obtain high frequency wave components;
(c) rectifier means for subjecting said high frequency wave components from said filter means to rectification to obtain rectified signals;
(d) integrator means for integrating the output from said rectifier means for a pre-set time duration within said reading-out period; and
(e) processing means for comparing the change in integrated value put out from said integrator means with the change of the position of the projection lens to monitor the focusing conditions, said integrated value being utilized as a contrast signal.

27. The device according to claim 26, wherein said high frequency wave components are subjected to full-wave rectification by said rectifier means (c).

28. The device according to claim 26, wherein said high frequency wave components are subjected to half-wave rectification by said rectifier means (c).

29. The device according to claim 26, wherein said image sensing means (a) is any of a CCD line sensor, a MOS type line sensor or an area sensor.

30. In a device for controlling a projection lens of an optical system to position said projection lens at the focusing position, a device for detecting focusing conditions of an image comprising:
(a) image sensing means for reading out projected image informations incident upon an image sensor within a certain accumulation time period to put out time series output signals for a reading-out period;
(b) filter means for filtering the output from said image sensing means to obtain high frequency wave components;
(c) rectifier means for subjecting said high frequency wave components from said filter means to rectification to obtain rectified signals;
(d) integrator means for integrating the output from said half-wave rectifier means for a pre-set time duration so that the initial and final portions of the effective output signals corresponding to effective picture elements are cut away; and
(e) processing means for comparing the change in integrated value put out from said integrator means with the change of the position of the projection lens to monitor the focusing conditions, said integrated value being utilized as a contrast signal.

31. The device according to claim 30, wherein said reading-out period is fixed.

32. The device according to claim 30, wherein said reading-out period is variable.

33. The device according to claim 30, wherein said image sensing means (a) is any of a CCD line sensor, a MOS type line sensor or an area sensor.

* * * * *